US008577535B2

(12) United States Patent
Cummings et al.

(10) Patent No.: US 8,577,535 B2
(45) Date of Patent: Nov. 5, 2013

(54) SYSTEM AND METHOD FOR PROVIDING PERCEIVED FIRST-ORDER CONTROL OF AN UNMANNED VEHICLE

(75) Inventors: Mary Louise Cummings, Cambridge, MA (US); David Joseph Pitman, Broomfield, CO (US); Paul Westlake Quimby, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 726 days.

(21) Appl. No.: 12/751,629

(22) Filed: Mar. 31, 2010

(65) Prior Publication Data

US 2011/0246015 A1 Oct. 6, 2011

(51) Int. Cl.
G01C 22/00 (2006.01)
G05D 1/00 (2006.01)

(52) U.S. Cl.
USPC ............... 701/23; 701/2; 701/24; 715/702

(58) Field of Classification Search
USPC ............ 701/2, 13, 24, 33, 36; 244/76 R, 179, 244/180, 181
See application file for complete search history.

(56) References Cited

U.S. PATENT DOCUMENTS

| 2002/0092350 | A1* | 7/2002 | Etkin et al. | 73/382 G |
|---|---|---|---|---|
| 2002/0165648 | A1 | 11/2002 | Zeitler | |
| 2003/0191561 | A1* | 10/2003 | Vos | 701/3 |
| 2005/0004723 | A1 | 1/2005 | Duggan et al. | |
| 2008/0077284 | A1* | 3/2008 | Swope | 701/5 |
| 2009/0073034 | A1* | 3/2009 | Lin | 342/357.07 |
| 2009/0125163 | A1* | 5/2009 | Duggan et al. | 701/2 |
| 2010/0157056 | A1* | 6/2010 | Zohar et al. | 348/144 |
| 2011/0122257 | A1* | 5/2011 | Kirk | 348/187 |

OTHER PUBLICATIONS

Sheridan, Tom P. and Verplank, William L. Human and Computer Control of Undersea Teleoperators, created at Massachusetts Institute of Technology, controlled by the Office of Naval Research, Engineering Psychology Programs, Aug. 18, 1978.

Sheridan, Thomas B. Space Teleoperation Through Time Delay: Review and Prognosis, IEEE Transactions on Robotics and Automation, vol. 9, Oct. 1993.

Rekimoto, Jun, Tilting Operations for Small Screen Interfaces, UIST '96—Proceedings of the 9th annual ACM Symposium on User Interface Software and Technology, pp. 167-168, 1996.

(Continued)

*Primary Examiner* — Khoi Tran
*Assistant Examiner* — Rachid Bendidi
(74) *Attorney, Agent, or Firm* — Peter A. Nieves; Sheehan Phinney Bass + Green PA

(57) ABSTRACT

A system for providing perceived first order control of an unmanned vehicle contains a memory and a processor configured by the memory to perform the steps of: receiving instructions for updating x-axis location, y-axis location, z-axis location, and/or heading of the unmanned vehicle; converting received instructions for updating x-axis location, y-axis location, z-axis location, and/or heading of the unmanned vehicle into a set of relative distance coordinates from a current location of the unmanned vehicle; and adjusting the set of relative distance coordinates by a gain control, to minimize coordinate change, wherein gain control provides a rate change in the x-axis location, y-axis location, z-axis location, and/or heading, resulting in a new set of coordinates. A screen displays a location dot representing current location of the unmanned vehicle and an outer limit circle surrounding the location dot representing an outer boundary for movement of the unmanned vehicle.

18 Claims, 8 Drawing Sheets

(56) References Cited

OTHER PUBLICATIONS

Kang Hyun Jo, Yoshinori Kuno, Yoshiaki Shirai, Manipulative Hand Gesture Recognition Using Task Knowledge for Human Computer Interaction, downloaded from IEEE Explore on Jul. 26, 2010.

Terrence Fong, Nathalie Cabrol, Charles Thorpe, Charles Baur, A Personal Interface for Collaborative Human-Robot Exploitation, International Symposium on Artificial Intelligence, Robotics and Automation in Space, Jun. 2001, Montreal Canada.

Hande Kaymaz Keskinpala, Julie A. Adams and Kazuhiko Kawamura, PDA-Based Human Interface, In Proceedings of the 2003 IEEE International Conference on Systems, Man and Cybernetics, Washington DC 2003, pp. 3931-3936.

Julie A. Adams and Hhande Kaymaz Keskinpala, Analysis of Perceived Workload When Using a PDA for Mobile Robot Teleoperation. In Proceedings of the 2004 IEEE International Conference on Robotics and Automation, pp. 4128-4133, 2004.

Samir Bouabdallah, Andre North and Roland Siegwart, PID vs LQ Control Techniques Applied to an Indoor Micro Quadrotor, In Proceedings of Int. Conf. on Robotics and Automation—ICRA 2004, New Orleans, USA.

Ikjin Jang and Wonabe Park, Gesture-Based User Interfaces for Handheld Devices Using Accelerometer, PCM 2004, LNCS 3331, pp. 359-368, Springer-Verlag Berlin Heidelberg, 2004.

Jessie Y.C. Chen, Ellen C. Haas, Michael J. Barnes, Human Performances Issues and User Interface Design for Teleoperated Robots, IEEE, Transactions on Systems, Man and Cybernetics—Part C: Applications and Reviews, vol. 37, No. 6, Nov. 2007, pp. 1231-1245.

M.L. Cummings, S. Bruni, S. Mercier, P.J. Mitchell, Automation Architecture for Single Operator, Multiple UAV Command and Control, The International C2 Journal, vol. 1, Nov. 2007, pp. 1-24.

Mehmet Onder EFE, Robust Low Attitude Behavior Control of a Quadrotor Rotorcraft Through Sliding Modes, Proceedings of the 15th Mediterranean Conference on Control and Automation, Jul. 27-29, 2007, Athens-Greece.

Paula J. Durlach, John L. Neumann, Deborah R. Billings, Training to Operate a Simulated Mirco-Unmanned Aerial Vehicle with Continuous or Discrete Manual Control, Technical Report 1229, United States Army Research Institute of the Behavioral and Social Sciences, May 2008.

LTC Win Keller and David L. Jones, Developing the Class I Unmanned Aerial System (UAS), Army AL&T, Apr.-Jun. 2008, pp. 30-33.

Gche De Croon, Kme De Clercq, R. Ruijsink, B. Remes, and C. De Wagter, Design, Aerodynamics and Vision-Based Control of the DelFLy, In the International Journal of Mirco Air Vehicles, vol. 1, No. 2, pp. 71-97, 2009.

Rodrigo Gutoerrez, Jeff Craighead, A Native iPhone Packbot OCU, HRI '09 Proceedings of the 4th ACM/IEEE international conference on Human robot interaction, pp. 193-194, Mar. 11-13, 2009.

Mark Micire, Jill L. Drury, Brenden Keyes and Holly A. Yanco, Multi-Touch Interaction for Robot Control, International Conference on Intelligent User Interfaces (IUI), Sanibel Island, Florida, Feb. 8-11, 2009.

Barry J. O'Brien, Cem Karan, Stuart H. Young, Focu:S-Future Operator Control Unit:Soldier, Unmanned Systems Technology XI, Proc. of SPIE vol. 7332 pp. 1-10, 2009.

Mahfuz Rahman, Sean Gustafson, Pourang Irani, Sriram Subramanian, Tilt Techniques: Investigating the Dexterity of Wrist-Based Input, CHI 2009—New Mobile Interactions, Apr. 9, 2009, Boston Massachusetts.

Aeroquad Forums—The Front Page, web page, http://aeroquad.com/content.php, downloaded on Jul. 26, 2010.

Ascending Technologies GMBH, AscTec Hummingbird with AutoPilot User's Manual, pp. 1-28, 2009.

Aerovironment, GCS—Joint Common Interoperable Ground Control Station Technical Specifications, 2009, www.avinc.com.

Draganflyer Innovations, Inc., Draganflyer X4 Helicopter Technical Specifications, downloaded Jul. 19, 2010 from http://www.draganfly.com/uav-helicopter/draganflyer-x4/specifications.

Draganflyer Innovations, Inc., Draganview Software-Draganflyer X6 Features-UAV Helicopter Aerial Video Platform, downloaded Jul. 19, 2010 from http://www.draganfly.com/uav-helicopter/draganflyer-x6/features/telemetry.php.

Parrot Ar.Drone, When Video Games Become Reality, Jan. 5, 2010.

Draganflyer Innovations, Inc., Handheld Flight Controller—Draganflyer X6 Features—UAV Helicopter Aerial Video Platform, downloaded Jul. 19, 2010 from http://www.draganfly.com/uav-helicopter/draganflyer-x6/features/controller.php.

Mircrodrones GMBH, md4-200 specification sheet and flyer, 2009.

James M. McMichael, Col. Michael S. Francis USAF (Ret)., Micro Air Vehicles—Toward a New Dimension in Flight, dated Aug. 7, 1997 and last updated December 18, 1997.

Honeywell, RQ-16 Tarantula Hawk, UAV Directory—Aircraft Specification, 2010.

\* cited by examiner

SYSTEM AND METHOD FOR PROVIDING PERCEIVED FIRST-ORDER CONTROL OF AN UNMANNED VEHICLE

GOVERNMENT SUPPORT

This invention was made with government support under Grant Number N00014-07-1-0230 awarded by the Navy. The government has certain rights in this invention.

FIELD OF THE INVENTION

The present invention is generally related to unmanned vehicle control, and more particularly is related to providing perceived first-order control of an unmanned vehicle.

BACKGROUND OF THE INVENTION

Field personnel, such as soldiers, police SWAT teams, and first responders face challenging, dangerous environments, often with little advance knowledge or information about their surroundings. Currently, this Intelligence, Surveillance & Reconnaissance (ISR) information is provided by archival pictures, satellite imagery and prior or second-hand experiences. Although satellite imagery is currently the preferred method for gaining Situational Awareness (SA) in military outdoor environments, it has many shortcomings. As is known by those skilled in the art, situational awareness is defined as the combination of perception of elements in the environment, the comprehension of their meaning, and the projection of their status in the future. Operator situational awareness captures the ability of operators to make effective choices as a function of information processing efficiency. As such, situational awareness can significantly influence human behavior and hence, human-unmanned vehicle system performance. Since situational awareness is dynamic, it can influence operator responses over time and as a result, can dynamically impact supervisory control performance.

Unclassified satellite imagery maps available to field personnel are two dimensional images, with no elevation information and/or fixed points of view. In addition, field personnel may use simple maps that are not provided by satellite imagery. These maps are often outdated, and, due to shadows and shading, give false impressions of elevations and details of the environment. Critical features of buildings, such as doorways and windows are hidden from view. Combined, these flaws often provide field personnel with a false mental model of their environment. As is known by those skilled in the art, a mental model is defined as the cognitive constructed, which is created by a user to aid them in comprehending how a system operates and guiding them in their decision making processes regarding the system.

Given the need of these personnel to simultaneously perform a primary task, such as finding a Person of Interest (POI), as well as exploring the environment, an autonomous robot (i.e., an unmanned vehicle) would allow these groups to better perform ISR and improve their SA in real-time. Recent efforts have led to the creation of Micro Aerial Vehicles (MAVs), a class of Unmanned Aerial Vehicle (UAV), which are small and have autonomous capabilities. An MAV can hover in place, perform Vertical Take-Off and Landing, and easily rotate with a small sensor payload. The compact size of these vehicles and their maneuvering capabilities make them well-suited for performing highly localized ISR missions with an MAV operator working within the same environment as the vehicle. These localized missions require users to devote significant amounts of cognitive resources to give the MAVs gross directions (i.e., going to a building of interest), and then 100% of attention to fine tune control of such a vehicle (i.e., position a vehicle at a window to peer in.)

Unfortunately, existing interfaces for MAVs, and unmanned vehicles in general, ignore the competing needs of field operators, requiring bulky equipment and the full attention of an operator. A majority of interfaces and Ground Control Stations (GCSs) require the full attention of the operator. These systems require extensive training before an operator can safely and effectively operate the MAV. GCSs that allow the operator to manually position and orient the MAV rely on a classical 1st order feedback control loop, which allows operators to directly control the thrust, pitch, and roll/yaw of the MAV. This complex feedback loop demands full attention of the operator, and thereby decreases overall SA of the operator of the environment and task at hand.

Human control of systems that incorporate one or more feedback loops is defined as an Nth order system, where N refers to the derivative of the feedback loop used in the controls. A 1st order feedback loop responds to changes in the first derivative of the system, such as velocity derived from position. Error, the difference between the output and the desired state, is fed back to the input in an attempt to bring the output closer to the desired state. For example, changing the heading of an MAV via a first-order feedback loop requires constantly changing the rate of yaw and roll of the MAV until the desired heading is reached. Typically, this is executed by humans as a pulse input that requires at least two distinct actions, namely, starting the turn and then ending the turn. In contrast, with a 0th order control loop, an operator simply provides a command with the desired heading, such as, South, and the vehicle autonomously turns to this heading. A 1st order system requires more attention by the operator as compared to a 0th order system since he or she must continually oversee the vehicle in order to stop, such as, but not limited to, a turn, at the right time.

A 2nd order control loop relies on changing the acceleration of the system. It is noted that inherently, UAV systems are $2^{nd}$ order systems. It is generally recognized that humans have significant difficulty controlling 2nd order and higher systems. Due to the increased complexity of the feedback loops and number of actions required to successfully complete a maneuver, the cognitive workload of an operator is significantly higher for 2nd order systems than when operating 0th or 1st order controls, leading to lower performance. Teleoperation, defined as the remote control of an unmanned vehicle via some set of external controls and displays, only exacerbates these problems because additional communication latencies are introduced into the system, in addition to the lack of sensory perception on the part of the operator, who is not physically present. When a human actor acts based on a GCS view that is delayed due to system latency, the result is often accidents involving the UAV.

While human operators are thought to be effective 1st order controllers, it is doubtful whether UAV operators can effectively execute 2nd order control of UAVs. System communication delays, the lack of critical perceptual cues, and the need for extensive training, which can result in pilot-induced oscillations and inappropriate control responses, suggest that 1st order control is a poor approach to any type of UAV (and unmanned vehicle) control. This problem is likely more serious for MAV operators who are not, by the nature of their field presence, able to devote the necessary cognitive resources needed to fully attend to the control dynamics of the MAV.

By comparison, a 0th order control loop significantly reduces the workload because the operator does not need to continually monitor the movement of the vehicle, such as, but not limited to, as the vehicle turns to a new heading, however, there is some cost in vehicle maneuverability. For operating a MAV, 0th order interfaces represent the highest degree of safety because users are not prone to errors as operators try to calculate the position of the vehicle.

Therefore, it is desirable to have an interface that can allow an operator to easily control an unmanned vehicle at a high-level supervisory mode of interaction for general commands, as well as a fine-grained, lower level of control when more nuanced actions are required. Such control should not require complete attention of operators, nor require extensive training.

SUMMARY OF THE INVENTION

Embodiments of the present invention provide a system and method for providing fine-tune control of an unmanned vehicle using perceived first-order control. For this invention, fine tune is defined as attempting to precisely control actions of an unmanned vehicle, position, or movement in missions that require detailed accuracy. Briefly described, in architecture, one embodiment of the system, among others, can be implemented as follows. The system contains a memory and a processor configured by the memory to perform the steps of: receiving instructions for updating x-axis location, y-axis location, z-axis location, and/or heading of the unmanned vehicle; converting the received instructions for updating x-axis location, y-axis location, z-axis location, and/or heading of the unmanned vehicle into a set of relative distance coordinates from a current location of the unmanned vehicle; and adjusting the set of relative distance coordinates by a gain control, to minimize coordinate change, wherein the gain control provides a rate change in the x-axis location, y-axis location, z-axis location, and/or heading, resulting in a new set of coordinates.

The processor may also be configured by the memory to perform the step of applying a constraint filter to the new set of coordinates prior to transmitting the new set of coordinates, wherein applying a constraint filter limits a magnitude of user commands received by the system to prevent the unmanned vehicle from moving into a location that is pre-defined as prohibited, application of the constraint filter to the new coordinates resulting in an absolute set of coordinates.

The processor may further be configured by the memory to perform the step of applying an obstacle collision filter to the new set of coordinates resulting in a bound new set of coordinates, wherein the obstacle collision filter evaluates whether the new set of coordinates exist within a space accessible to the unmanned vehicle.

The processor may still further be configured by the memory to perform the step of determining whether the new set of coordinates are accessible by the unmanned vehicle.

A screen of the system illustrates an outer circle and a location dot. The outer circle provides a visual illustration of the absolute constraints on movement of the unmanned vehicle. In addition, the location dot provides a visual illustration of the current location of the unmanned vehicle and the degrees of freedom that the user can move the unmanned vehicle. Physical movement of the system results in movement of the location dot toward or away from the outer circle, thereby allowing the operator of the system to control the rate of position update data, and providing the operator with a sense of position and velocity of the unmanned vehicle.

Other systems, methods, and features of the present invention will be or become apparent to one with skill in the art upon examination of the following drawings and detailed description. It is intended that all such additional systems, methods, and features be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method may use multimodal interaction, which uses two or more distinct mediums of interactions to enhance the usability of an interface. Alternatively, a single mode of interaction may be used to interact with the interface. Specifically, the present system and method provides for fine-tune control of unmanned vehicles through use of an interface that provides supervisory control. A perceived first order control is provided by the present system and method, which provides a stable and safe $0^{th}$ order system control, while allowing operators to perceive $1^{st}$ order control so as to achieve effective control of an unmanned vehicle with minimal training. An example of such an unmanned vehicle may be, but is not limited to, a Micro Aerial Vehicle (MAV), which is a class of Unmanned Aerial Vehicle (UAV). It should be noted that, although portions of the following description are provided with reference to control of an Unmanned Aerial Vehicle (UAV), the present system and method is not limited to controlling of a UAV, but instead, may be used to control any unmanned vehicle or teleoperated device. In addition, while the present description is provided with regard to teleoperation of unmanned vehicles, it should be noted that the present system and method is applicable to unmanned vehicles that are controlled by any level of supervisory control.

It should be noted that while the users of the present system and method perceive that they are operating the unmanned vehicle via a $1^{st}$ order control interface, perceived $1^{st}$ order control actually communicates with the unmanned vehicle via a $0^{th}$ order control loop to prevent the user from putting the unmanned vehicle in jeopardy. This allows the user to accurately predict the movement of the MAV, as well as easily formulate plans for movement.

Perceived first order control, as provided by the present invention, converts $1^{st}$ order commands of a user into a $0^{th}$ order control system providing fine-tune control, which provides positional updates. By working in a $0^{th}$ order control loop, which uses absolute coordinates, user commands are time invariant. This time invariance eliminates the problem of over/under shooting a target when controlling the unmanned vehicle, which is inherent to $1^{st}$ or $2^{nd}$ order control systems.

Figure 1:
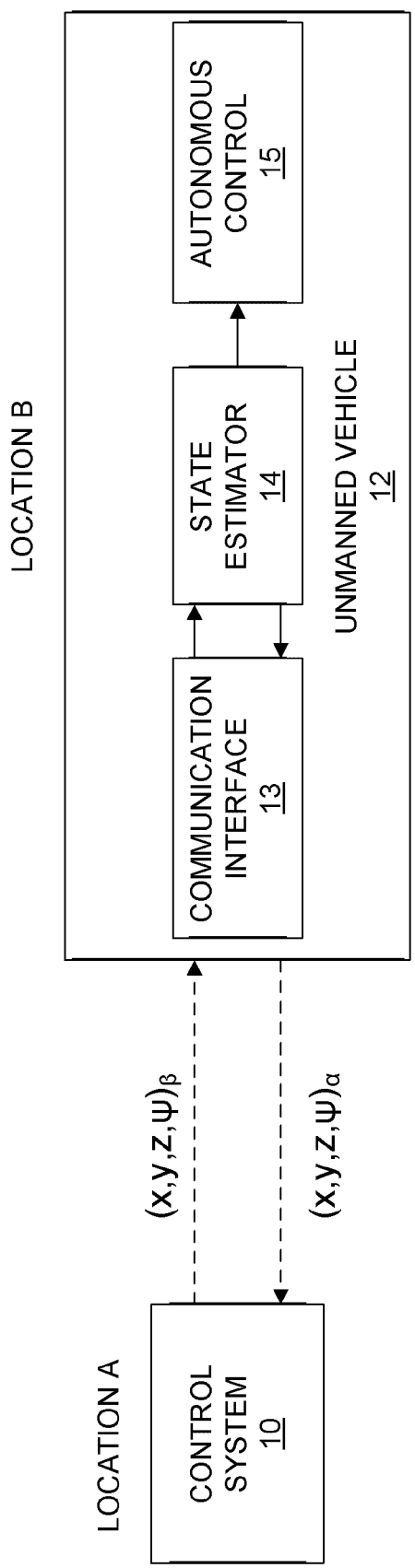
FIG. 1 is a schematic diagram illustrating an example of communication between a control system and an unmanned vehicle, as provided by the present invention.

FIG. 1 is a schematic diagram illustrating an example of communication between a control system 10, as provided by the present invention, and an unmanned vehicle 12. Communication between the control system 10 and the unmanned vehicle 12 may be provided by one or more different communication methods, such as, but not limited to, wireless communication, satellite communication, and wired communication.

Control functions as defined by the control system 10 located at location A, and described in detail below, are transmitted to the unmanned vehicle 12, located at location B, and received by a state estimator 14 of the unmanned vehicle 12, via a communication interface 13. The state of a vehicle can be, but is not limited to, the position, orientation and associated first order derivatives. As is known by those having ordinary skill in the art, the state estimator 14 of the unmanned vehicle 12 takes, as input, the noisy measurements of some function of the state of the vehicle, such as, but not limited to, those obtained by sensors, and outputs an estimate of the state of the vehicle. The unmanned vehicle 10 may also contain an autonomous controller 15 for moving the unmanned vehicle to an assigned location.

It should be noted that in accordance with the present invention, the state estimator 14 may instead be located at the control system 10. In addition, the autonomous controller 15 may instead be located at either the control system 10 or at a location remote from both the control system 10 and the unmanned vehicle 12, so that the unmanned vehicle 12 only receives movement commands. In summary, while the present embodiment described herein refers to the unmanned vehicle 12 having the state estimator 14 and autonomous control 15 therein, the location of these elements is not intended to be a limitation of the present invention, and instead, as described above, the location of these elements may vary.

Functionality of the present control system 10 and method can be implemented in software, firmware, hardware, or a combination thereof. In a first exemplary embodiment, a portion of the control system 10 is implemented in software, as an executable program, and is executed by a special or general-purpose digital computer, such as a personal computer, personal data assistant, smart phone, workstation, minicomputer, or mainframe computer. The first exemplary embodiment of a general-purpose computer architecture that can implement the control system 10 is shown in FIG. 2.

Figure 2:
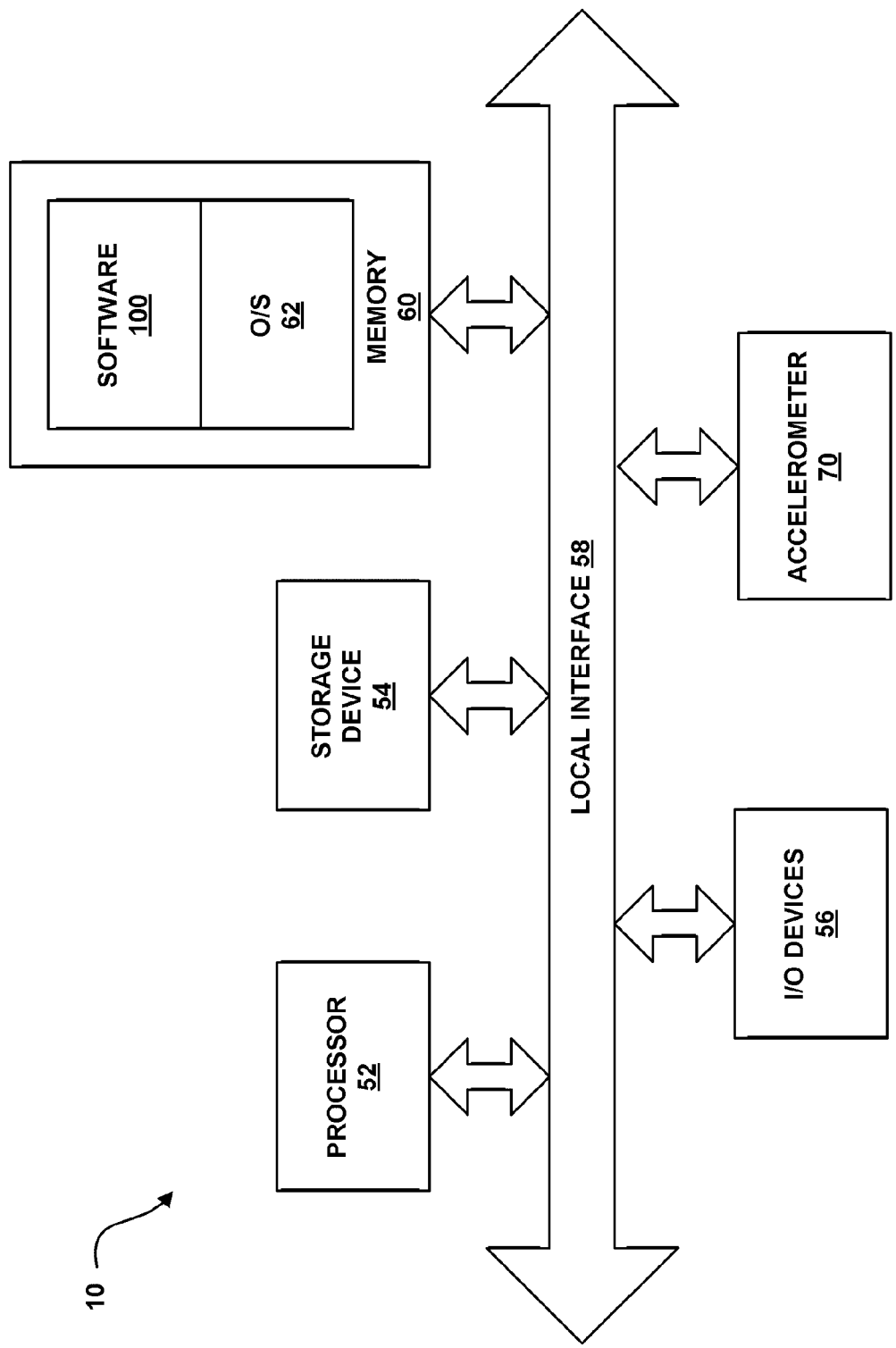
FIG. 2 is a schematic diagram illustrating a general-purpose computer architecture that can implement the control system of the present invention.

Generally, in terms of hardware architecture, as shown in FIG. 2, the computer 10 includes a processor 52, memory 60, storage device 54, and one or more input and/or output (I/O) devices 56 (or peripherals) that are communicatively coupled via a local interface 58. The local interface 58 can be, for example but not limited to, one or more buses or other wired or wireless connections, as is known in the art. The local interface 58 may have additional elements, which are omitted for simplicity, such as controllers, buffers (caches), drivers, repeaters, and receivers, to enable communications. Further, the local interface 58 may include address, control, and/or data connections to enable appropriate communications among the aforementioned components.

The processor 52 is a hardware device for executing software, particularly that stored in the memory 60. The processor 52 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 60 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 60 may incorporate electronic, magnetic, optical, and/or other types of storage media. Note that the memory 60 can have a distributed architecture, where various components are situated remote from one another, but can be accessed by the processor 52.

The software 100 in the memory 60 may include one or more separate programs, each of which contains an ordered listing of executable instructions for implementing logical functions of the control system 10, as described below. In the example of FIG. 2, the software 100 in the memory 60 defines the control system 10 functionality in accordance with the present invention. In addition, although not required, it is possible for the memory 60 to contain an operating system (O/S) 62. The operating system 62 essentially controls the execution of computer programs and provides scheduling, input-output control, file and data management, memory management, and communication control and related services.

The control system 10 may be provided by a source program, executable program (object code), script, or any other entity containing a set of instructions to be performed. When a source program, then the program needs to be translated via a compiler, assembler, interpreter, or the like, which may or may not be included within the memory 60, so as to operate properly in connection with the O/S 62. Furthermore, the control system 10 can be written as (a) an object oriented programming language, which has classes of data and methods, or (b) a procedure programming language, which has routines, subroutines, and/or functions.

The I/O devices 56 may include input devices, for example but not limited to, a touch screen in a conventional touch mode (CT) embodiment of the invention being the second exemplary embodiment of the invention (as discussed herein), a keyboard, mouse, scanner, microphone, joystick or other input device. Furthermore, the I/O devices 56 may also include output devices, for example but not limited to, a display, or other output devices. The I/O devices 56 may further include devices that communicate via both inputs and outputs, for instance but not limited to, a modulator/demodulator (modem; for accessing another device, system, or network), a radio frequency (RF) or other transceiver, a telephonic interface, a bridge, a router, or other devices that function both as an input and an output.

When the control system 10 is in operation, the processor 52 is configured to execute the software 100 stored within the memory 60, to communicate data to and from the memory 60, and to generally control operations of the computer 10 pursuant to the software 100. The software 100 and the O/S 62, in whole or in part, but typically the latter, are read by the processor 52, perhaps buffered within the processor 52, and then executed.

When the control system 10 is implemented in software, as is shown in FIG. 2, it should be noted that the control system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The control system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In accordance with a first exemplary embodiment of the invention, the control system 10 may also contain an accelerometer 70 for sensing orientation of the control system 10. In fact, the accelerometer 70 may be considered an I/O device 56. The accelerometer 70 is used in a natural gesture (NG) mode of the control system 10, which uses a set of tilting gestures of the control system 10 to control the unmanned vehicle. It should be noted that the accelerometer 70 may instead be an inertial measurement unit (IMU) or the equivalent, providing information regarding orientation of the control system 10 in three dimensions.

As previously mentioned, in accordance with a second exemplary embodiment of the invention, the control system 10 contains a touch screen for allowing a user of the control system 10 to provide touch gestures to the control system 10, which are used to control the unmanned vehicle.

In an alternative embodiment, where the control system 10 is implemented in hardware, the control system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or other technologies.

The present control system 10 allows for a user of the control system 10 to use one of two modes to allow the user to remotely operate an unmanned vehicle. The first mode is the natural gesture (NG) mode, while the second mode is the conventional touch (CT) mode. It should be noted that both the NG mode and the CT mode may be provided for by the same control system 10, as described in the flow chart of FIG. 3.

Figure 4:
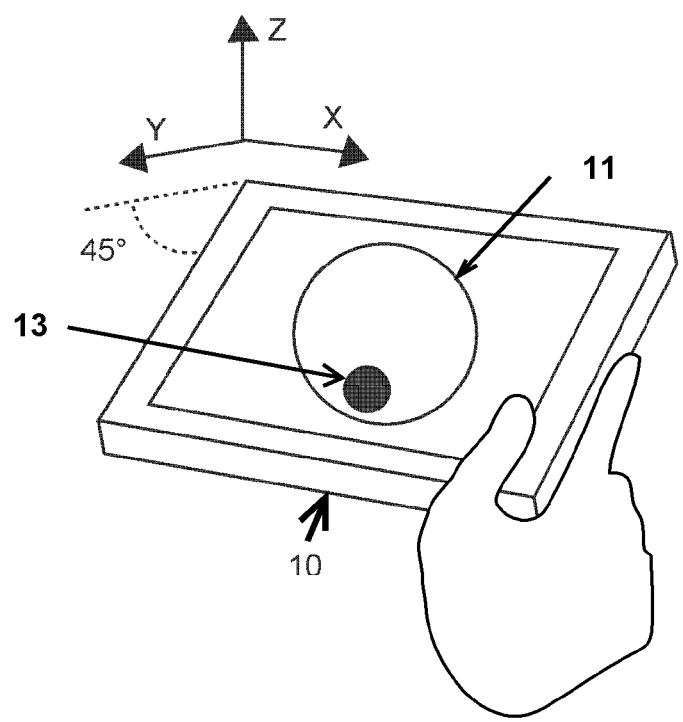
FIG. 4 is a schematic diagram providing an example of the control system, as well as angle of tilt.

In accordance with the present invention, NG mode allows for modification in x-axis and y-axis location of the unmanned vehicle by tilting the entire control system 10 in the direction that the operator intends for the unmanned vehicle to travel. As is known by those having ordinary skill in the art, when the control system 10 is tilted, the accelerometer 70 is used to determine positional changes. The angle of the tilt vector in two dimensions defines the relative distance in the x-axis and/or y-axis of the new coordinates. FIG. 4 is a schematic diagram providing an example of the control system 10 as well as angle of tilt.

In accordance with an alternative embodiment of the invention, movement of the control system 10 may also be used to control z-axis coordinates and heading of the unmanned vehicle. One having ordinary skill in the art would appreciate that many different techniques of control system movement may be used to control z-axis and heading. As an example, lifting and lowering of the control system 10 may be used to change z-axis location of the unmanned vehicle.

Figure 5:
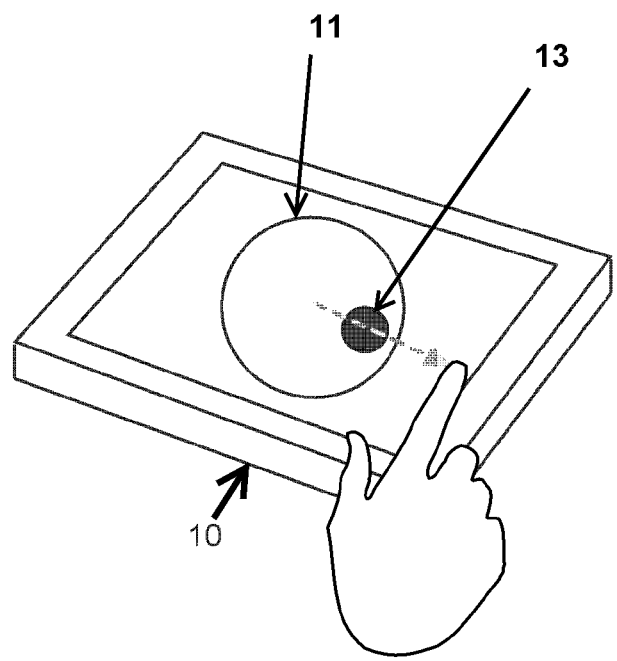
FIG. 5 is a schematic diagram providing an example of touching and dragging the screen of the control system to control x-axis and/or y-axis location, as provided by the conventional touch mode.

Instead of providing for updates in the x-axis and y-axis location of the unmanned vehicle by tilting the entire control system 10, in the conventional touch mode, the operator can control the x-axis and y-axis location by touching and dragging the screen of the control system 10 in the direction intended from the center of the display. The length of the drag corresponds to the relative distance to travel, while the angle of the drag corresponds to the direction in x-axis and/or y-axis that the unmanned vehicle should travel. FIG. 5 is a schematic diagram providing an example of touching and dragging the screen of the control system 10 to control x-axis and/or y-axis location, as provided by the conventional touch mode embodiment of the invention.

Figure 6:
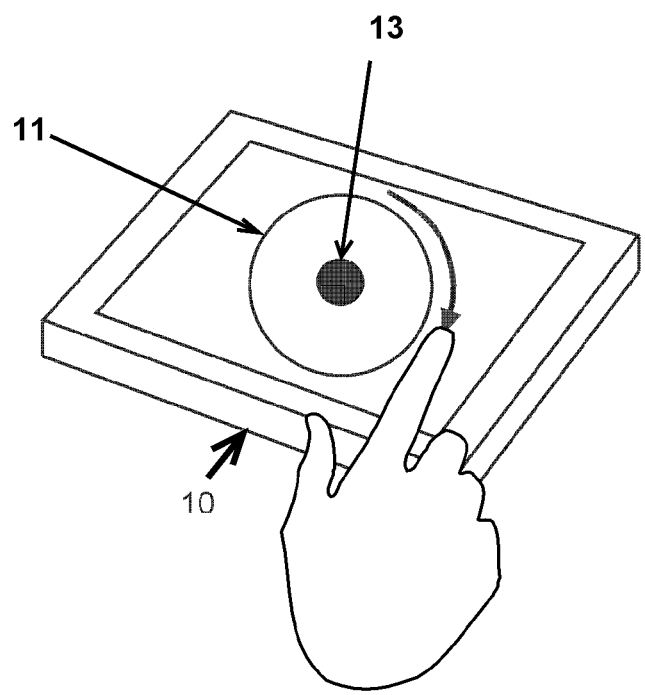
FIG. 6 is a schematic diagram providing an example of touching and dragging the screen of the control system to control location in heading, as provided by the conventional touch mode.

In conventional touch mode, the operator may also control the heading, or angle, of the unmanned vehicle. Such control may be provided by the operator touching and dragging the screen of the control system 10 in a circular motion. FIG. 6 is a schematic diagram providing an example of touching and dragging the screen of the control system 10 to control the location in heading of the unmanned vehicle, as provided by the conventional touch mode embodiment of the invention.

In the conventional touch mode, an operator of the control system 10 can change the z value of the coordinates through two types of interactions. It should be noted that the following are examples of how to change z-axis location via use of the touch screen, however, one having ordinary skill in the art will appreciate that other touch screen methods may be used to change z-axis location via use of the touch screen and such other methods are intended to be included within the present description. A first interaction involves performing a pinch gesture on the screen of the control system 10, while a second interaction involves performing a stretch gesture on the screen of the control system 10. Performing a pinch gesture on the screen of the control system 10 causes the control system 10 to issue a new position command with a change in the z-axis that is a relative decrement. Alternatively, performing a stretch gesture on the screen of the control system 10 results in a new position command with a change in the z-axis that is a relative increment of the z coordinate.

FIGS. 4-6 also demonstrate elements that provide for perceived first order control of the unmanned vehicle. As shown, the screen of the control system 10 illustrates an outer circle 11 and a location dot 13. The outer circle 11 provides a visual illustration of the absolute constraints on movement of the unmanned vehicle. In addition, the location dot 13 provides a visual illustration of the current location of the unmanned vehicle and the degrees of freedom that the user can move the unmanned vehicle. Movement of the control system 10 results in movement of the location dot 13 toward or away from the outer circle 11, thereby allowing the operator of the control system 10 to control the rate of position update data, and providing the operator with a sense of position and velocity of the unmanned vehicle.

Examples of movement of the location dot 13 may include the location dot 13 moving toward the left edge of the outer circle 11 when the control system 10 is tilted to the left and the location dot 13 moving toward the top left edge of the outer circle 11 when the control system is tilted forward and to the left. Such perceived first order control allows the operator to feel that he/she is directly controlling the unmanned vehicle, when in fact he/she is updating x-axis location, y-axis location, z-axis location, and/or heading of the unmanned vehicle in a manner described by the description of the flow chart of FIG. 3.

It should be noted that the present invention is not intended to be limited by use of the outer circle 11 and position dot 13. Instead, a different method may be used to visually demonstrate control by the operator.

Figure 7:
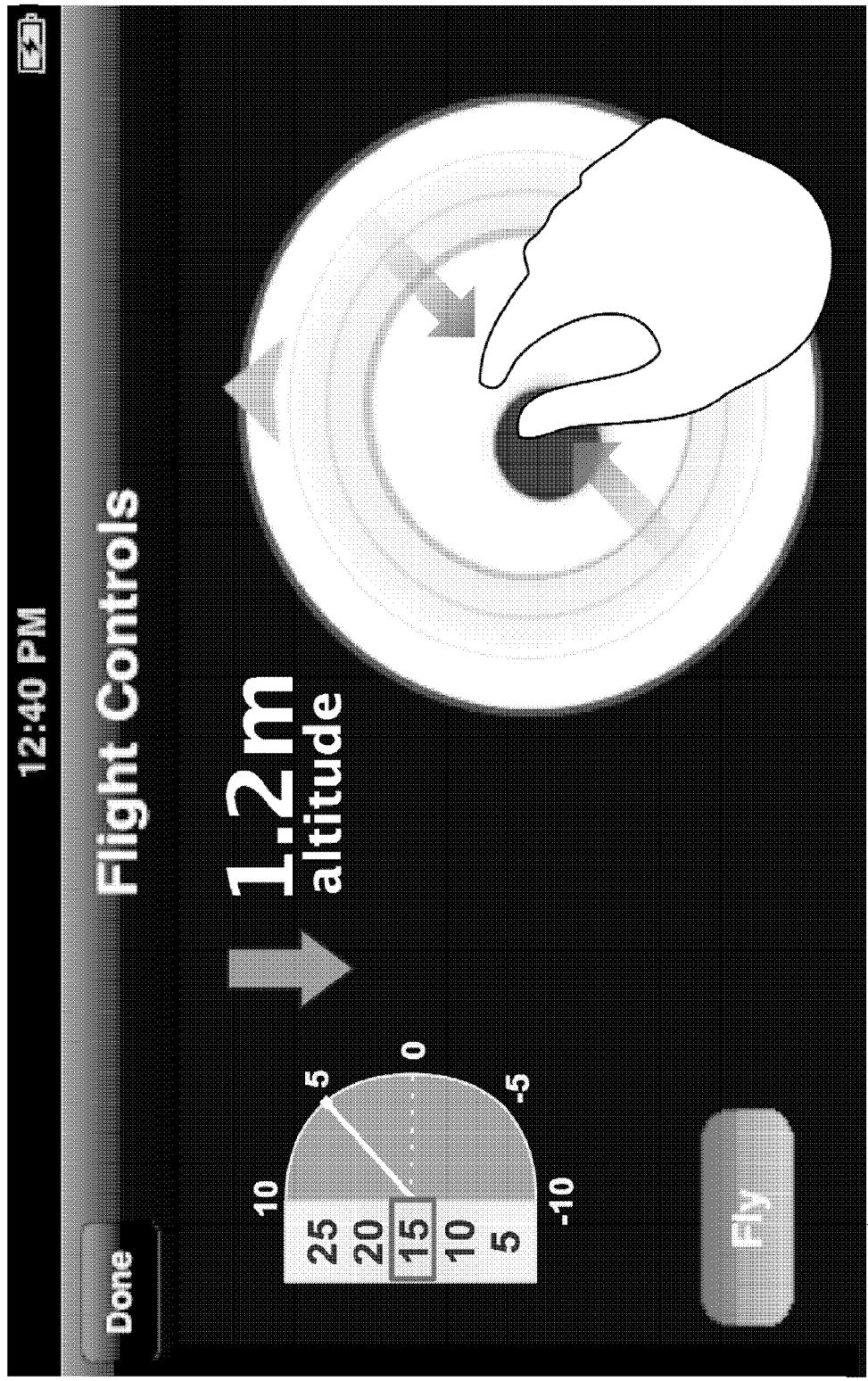
FIG. 7 is a schematic diagram providing an example of decreasing altitude of an unmanned vehicle, or position on the z-axis, by making a pinch gesture.
Figure 8:
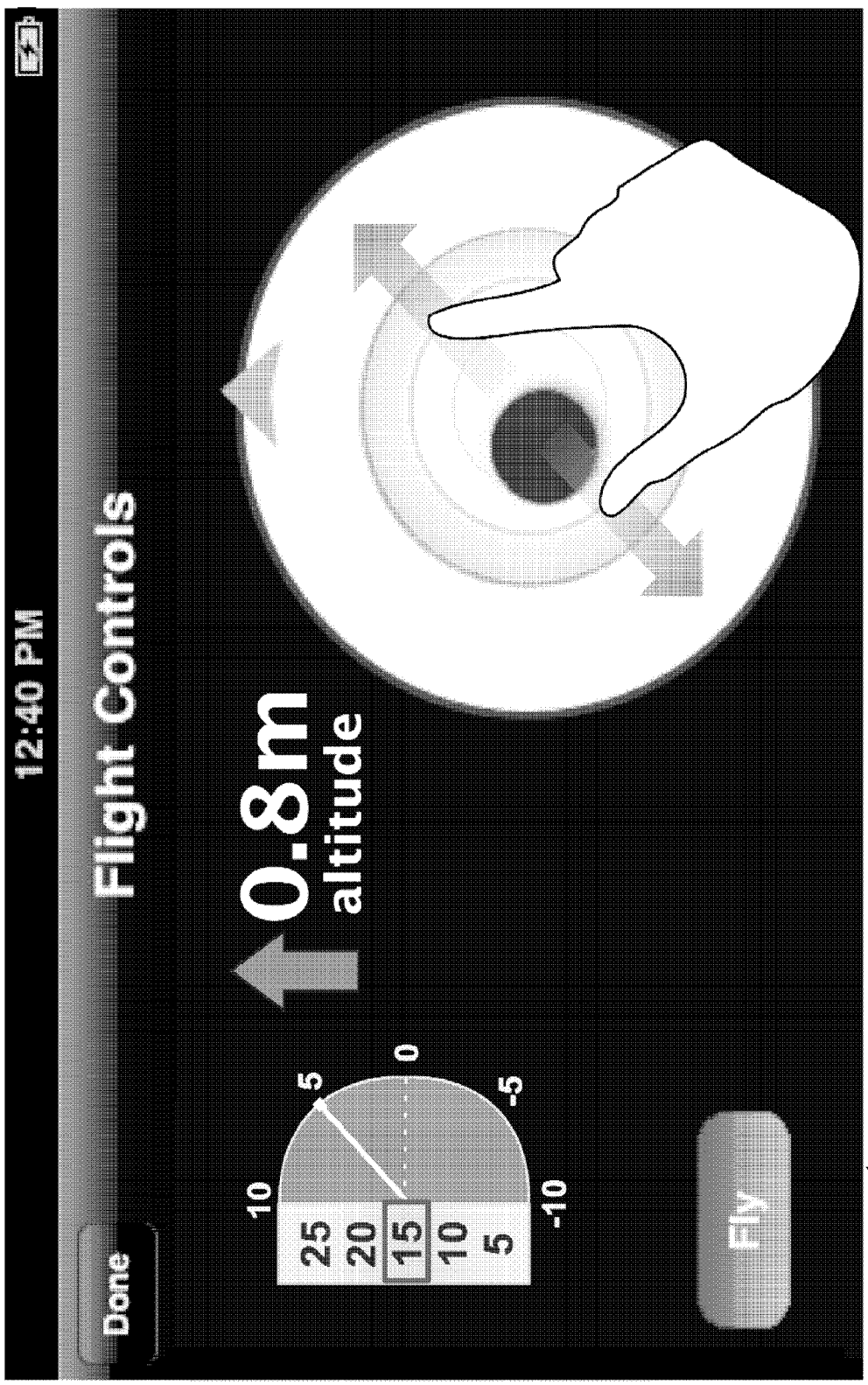
FIG. 8 is a schematic diagram providing an example of increasing altitude of an unmanned vehicle, or position on the z-axis, by making a stretch gesture.

FIG. 7 is a schematic diagram providing an example of decreasing altitude of an unmanned vehicle, or position on the z-axis, by making a pinch gesture on the screen of the control system 10. The example of FIG. 7 illustrates a 1.2 m decrease in altitude of the unmanned vehicle due to the pinch gesture. In addition, FIG. 8 is a schematic diagram providing an example of increasing altitude of an unmanned vehicle, or position on the z-axis, by making a stretch gesture on the screen of the control system 10. The example of FIG. 8 illustrates a 0.8 m increase in altitude of the unmanned vehicle due to the stretch gesture.

It should be noted that other touch screen methods may be used to change x-axis, y-axis, z-axis, and heading location via use of the touch screen. In addition, if a change is made in one coordinate system, changes in other coordinate systems are not made. As an example, if a change is made in the z-axis location, x-axis, y-axis, and heading locations are not modified in calculation of new coordinates for the unmanned vehicle.

Figure 3:
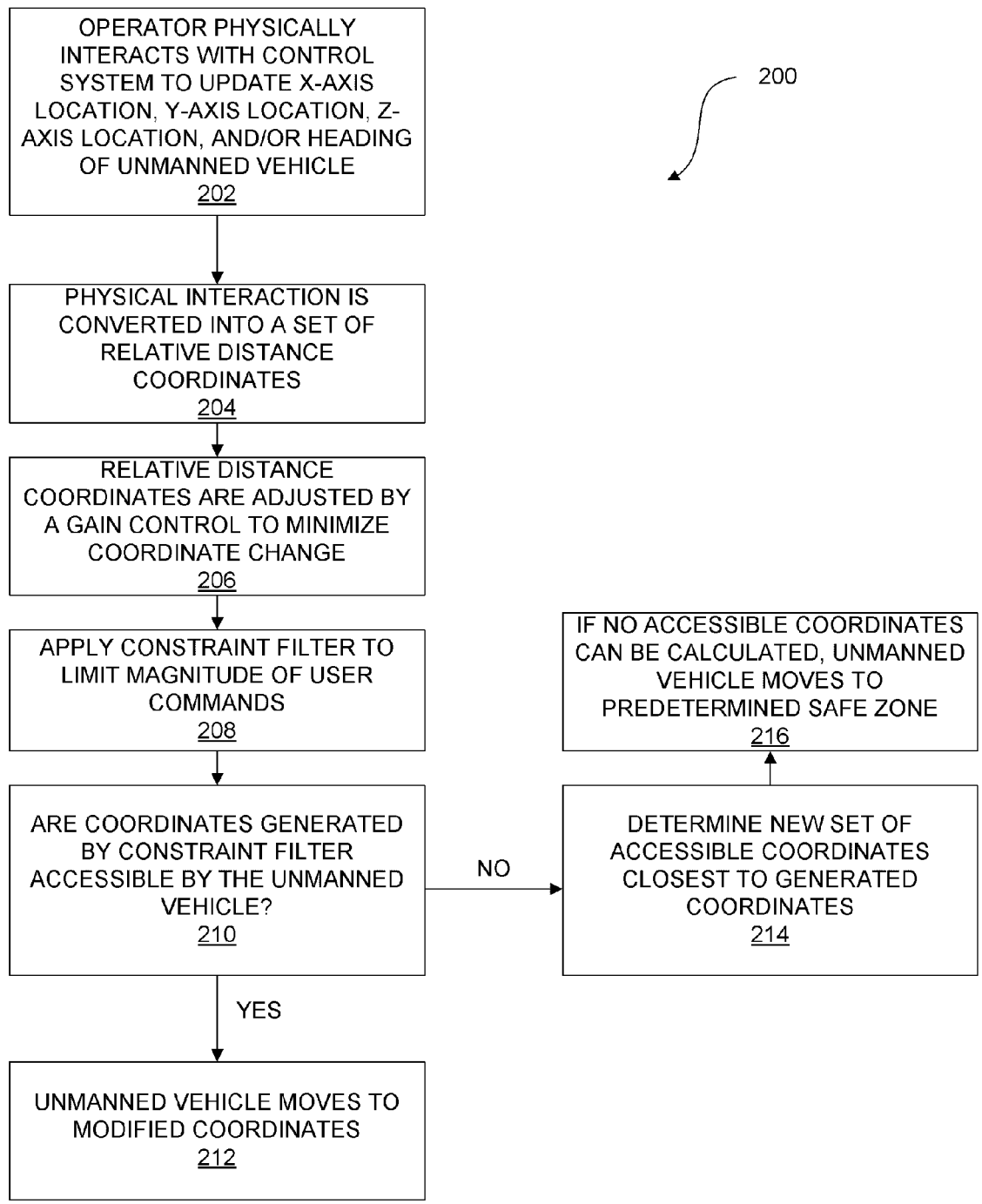
FIG. 3 is a flow chart illustrating the main steps taken by the control system.

FIG. 3 is a flow chart 200 that illustrates the main steps taken by the control system 10 when combining the natural gesture mode and the conventional touch mode. The following describes both modes. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, an operator of the control system 10 physically interacts with the control system 10 (i.e., tilting the control system 10 or touching the screen of the control system 10) to update x-axis location, y-axis location, z-axis location, and/or heading of the unmanned vehicle.

Referring back to FIG. 3, as shown by block 204, physical interaction with the control system 10 (i.e., tilting the control system 10 or touching the screen of the control system 10) is first converted into a set of relative distance (rel) coordinates $(x, y, z, \Psi)_{rel}$ from the current location of the unmanned vehicle. An example of such relative distance coordinates may be "+1.0 m, −0.5 m, +0.05 m, +27 deg," or any other relative distance coordinates. It should be noted, for example, that coordinates x, y, and z may be in measures of meters, while $\Psi$ is an angle. It should also be noted, as previously mentioned, that if a change is made in one coordinate system alone, changes in other coordinate systems are not made, thereby resulting in a zero value for other relative coordinates. As an example, if a change is made in the z-axis location alone, in the above example, the relative distance coordinates would be "0, 0, +0.05 m, 0".

As shown by block 206, the relative coordinates are then adjusted by a gain control (k), as defined by the software 100, to minimize coordinate change. Gain control is a predefined relationship between tilt of the control system 10 and an associated change in x-axis location, y-axis location, z-axis location, and/or heading. Specifically, the control system 10 has predefined therein an amount of modification or a rate change that will result from specific tilt angles of the control system. As an example, tilting the control system 10 so that a distal end of the control system 10 is pointed downward by more than a forty-five degree angle may equate to increasing x-axis location of the unmanned vehicle by one meter per second tilted. The gain control can be set by the operator of the control system 10, through external training agencies, or automatically calculated based upon previous interactions of the operator with the unmanned vehicle. The result after adjusting the relative coordinates by the gain control is a new set of relative coordinates that may be used as new position control commands for the unmanned vehicle.

As shown by block 208, after deriving the new set of coordinates, the control system 10 may apply a constraint filter, as defined by the software 100, to limit the magnitude of user commands received by the control system 10, as well as modify commands that could send the unmanned vehicle into an inaccessible region, such as, for example, a no fly zone. An example of use of a constraint filter is shown by equation 1 shown below.

The constraint filter translates the relative distance coordinates $(x, y, z, \Psi)_{rel}$ into an absolute set $(\beta)$ of coordinates, $(x, y, z, \Psi)_\beta$, representing, for example, latitude, longitude, altitude, and heading. The unmanned vehicle can move to these coordinates $(\beta)$ by incorporating feedback from the current $(\alpha)$ coordinates $(x, y, z, \Psi)_\alpha$ of the autonomous unmanned vehicle, provided by the state estimator located within the unmanned vehicle.

$$(x,y,z,\Psi)_\beta = k((x,y,z,\Psi)_{rel}) + (x,y,z,\Psi)_\alpha \qquad \text{(Eq. 1)}$$

As shown by block 210, a determination is made by an obstacle collision filter, as defined by the software 100, as to whether the coordinates, $\beta$, generated by the constraint filter are accessible by the unmanned vehicle. The obstacle collision filter may provide this evaluation by use of an obstacle collision algorithm. This evaluation can be based on input from sensors, representations of the environment, or user-defined parameters. Examples of such sensors may include Light Detection And Ranging (LIDAR), which is an optical remote sensing technology that measures properties of scattered light to find a range and/or other information of a distant target. Another example of a representation of the environment that could be used for obstacle detection includes Simultaneous Localization and Mapping (SLAM). Further, an example of user-defined parameters includes a no fly zone.

If the coordinates are accessible by the unmanned vehicle 12, the autonomous controller 15 in the unmanned vehicle moves the unmanned vehicle to the coordinates (block 212). If the coordinates, β, are not accessible by the unmanned vehicle, as determined by the obstacle collision filter, the control system 10 determines a new set of accessible coordinates, herein known as the modified coordinates, that are closest to the β coordinates (block 214) and the unmanned vehicle moves to the modified coordinates, as instructed by the autonomous controller 15 of the unmanned vehicle 12. An example of modifying the coordinates would be converting a set of coordinates which are located within a solid obstacle to a set of coordinates that are between the current location of the unmanned vehicle, as provided by the state estimator, and the surface of the obstacle.

Alternatively, as shown by block 216, if there are no accessible coordinates that can be calculated by the control system 10, predetermined safe zone coordinates, as stored within the control system 10, are transmitted to the unmanned vehicle and the unmanned vehicle moves to the predetermined safe zone. Specifically, coordinates of predetermined safe zones are predefined within the control system 10 so that they may be used at a later date as described above.

It should be noted that in different embodiments of the invention, certain steps as described by the description of FIG. 3 may not be provided. As an example, adjusting by a gain control, applying a constraint filter, and/or binding by the obstacle collision filter may be included or not included as steps taken by the control system 10.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for providing perceived first order control of an unmanned vehicle, comprising:
    a memory; and
    a processor configured by the memory to perform the steps of:
    receiving instructions comprising a first order command, velocity, updating an x-axis location, a y-axis location, a z-axis location, and/or a heading of the unmanned vehicle;
    converting the received instructions into a set of relative distance coordinates from a current location of the unmanned vehicle; and
    adjusting the set of relative distance coordinates by a gain control, to minimize coordinate change, wherein the gain control provides a rate change in the x-axis location, y-axis location, z-axis location, and/or heading, resulting in a new set of coordinates.

2. The system of claim 1, wherein the instructions for updating x-axis location, y-axis location, z-axis location, and/or heading of the unmanned vehicle is provided by an operator of the system tilting the system and the system interpreting the tilting as a changing in x-axis and/or y-axis location of the unmanned vehicle.

3. The system of claim 2, wherein the system further comprises an accelerometer for determining positional changes in the system.

4. The system of claim 1, wherein the instructions for updating the x-axis location, y-axis location, z-axis location, and/or heading of the unmanned vehicle is provided by an operator of the system touching a screen of the system and the system interpreting the touching as a changing in the x-axis and/or y-axis location of the unmanned vehicle.

5. The system of claim 1, wherein the processor is further configured by the memory to perform the step of applying a constraint filter to the new set of coordinates prior to transmitting the new set of coordinates, wherein applying a constraint filter limits a magnitude of user commands received by the system when receiving updating instruction to prevent the unmanned vehicle from moving into a location that is predefined as prohibited, application of the constraint filter to the new coordinates resulting in an absolute set of coordinates.

6. The system of claim 1, further comprising transmitting the new set of coordinates to the unmanned vehicle.

7. The system of claim 1, wherein the processor is further configured by the memory to perform the step of applying an obstacle collision filter to the new set of coordinates resulting in a bound new set of coordinates, wherein the obstacle collision filter evaluates whether the new set of coordinates exist within a space accessible to the unmanned vehicle.

8. The system of claim 1, wherein the processor is further configured by the memory to perform the step of determining whether the new set of coordinates are accessible by the unmanned vehicle.

9. The system of claim 8, wherein if the new set of coordinates are not accessible by the unmanned vehicle, the processor is further configured by the memory to perform the step of determining a new set of accessible coordinates that are closest to the new set of coordinates.

10. The system of claim 5, wherein the processor is further configured by the memory to perform the step of applying an obstacle collision filter to the absolute set of coordinates resulting in a bound absolute set of coordinates, wherein the obstacle collision filter evaluates whether the absolute set of coordinates exist within a space accessible to the unmanned vehicle.

11. The system of claim 10, wherein the processor is further configured by the memory to perform the step of determining whether the bound absolute set of coordinates are accessible by the unmanned vehicle.

12. The system of claim 5, wherein the processor is further configured by the memory to perform the step of determining whether the absolute set of coordinates are accessible by the unmanned vehicle.

13. The system of claim 7, wherein the processor is further configured by the memory to perform the step of determining whether the bound new set of coordinates are accessible by the unmanned vehicle.

14. The system of claim 1, wherein the system further comprises a screen displaying a location dot representing current location of the unmanned vehicle and an outer limit circle surrounding the location dot representing an outer boundary for movement of the unmanned vehicle, and wherein the instructions for updating the x-axis location, y-axis location, z-axis location, and/or heading of the unmanned vehicle result in movement of the location dot within the outer limit circle surrounding the location dot.

15. A method for providing perceived first order control of an unmanned vehicle, comprising the steps of:
    receiving instructions comprising a first order command updating an x-axis location, a y-axis location, a z-axis location, and/or a heading of the unmanned vehicle;
    converting the received instructions by processor into a set of relative distance coordinates from a current location of the unmanned vehicle; and
    adjusting the set of relative distance coordinates by a gain control, to minimize coordinate change, wherein the gain control provides a rate change in the x-axis location, y-axis location, z-axis location, and/or heading, resulting in a new set of coordinates.

16. The method of claim 15, further comprising the step of applying a constraint filter to the new set of coordinates prior to transmitting the new set of coordinates, wherein applying a constraint filter limits a magnitude of user commands received when receiving updating instruction to prevent the unmanned vehicle from moving into a location that is predefined as prohibited, application of the constraint filter to the new coordinates resulting in an absolute set of coordinates.

17. The method of claim 15, further comprising the step of applying an obstacle collision filter to the new set of coordinates resulting in a bound new set of coordinates, wherein the obstacle collision filter evaluates whether the new set of coordinates exist within a space accessible to the unmanned vehicle.

18. The method of claim 15, further comprising the step of determining whether the new set of coordinates are accessible by the unmanned vehicle.

* * * * *